G. H. TREPANIER.
DOUGHNUT DRAINER.
APPLICATION FILED AUG. 15, 1908.
923,465.
Patented June 1, 1909.
2 SHEETS—SHEET 1.
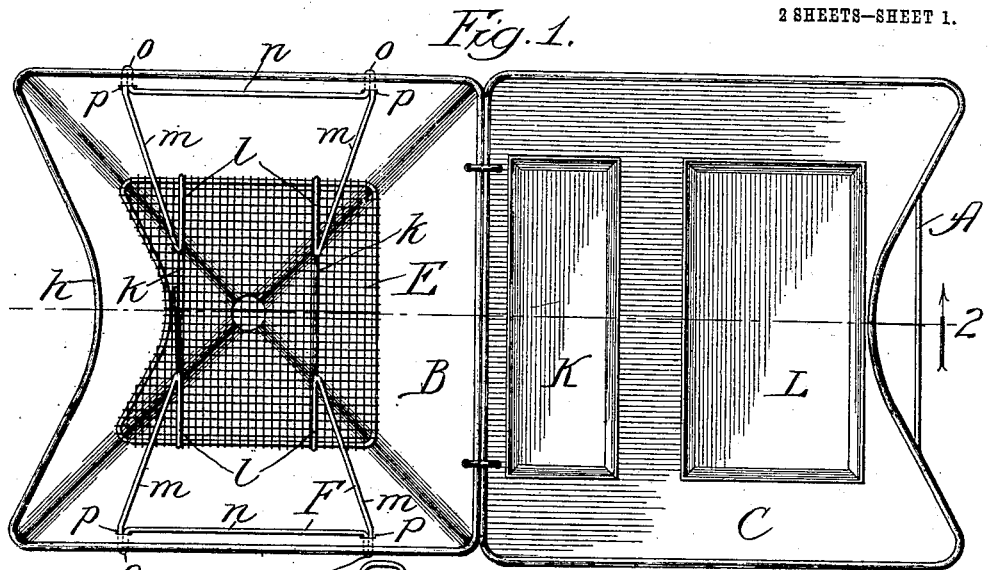
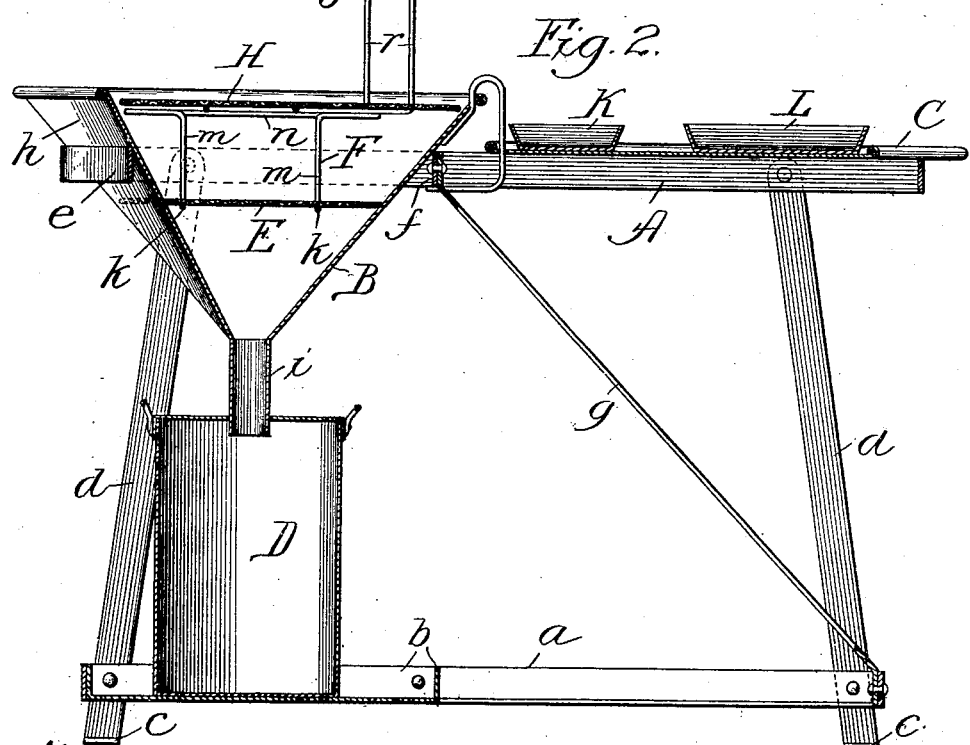
Witnesses:
John Enders
Clyde Palmer
Inventor:
George H. Trepanier,
By Dyrenforth, Lee, Chritton & Wiles
Attys.

G. H. TREPANIER.
DOUGHNUT DRAINER.
APPLICATION FILED AUG. 15, 1908.
923,465.
Patented June 1, 1909.
2 SHEETS—SHEET 2.
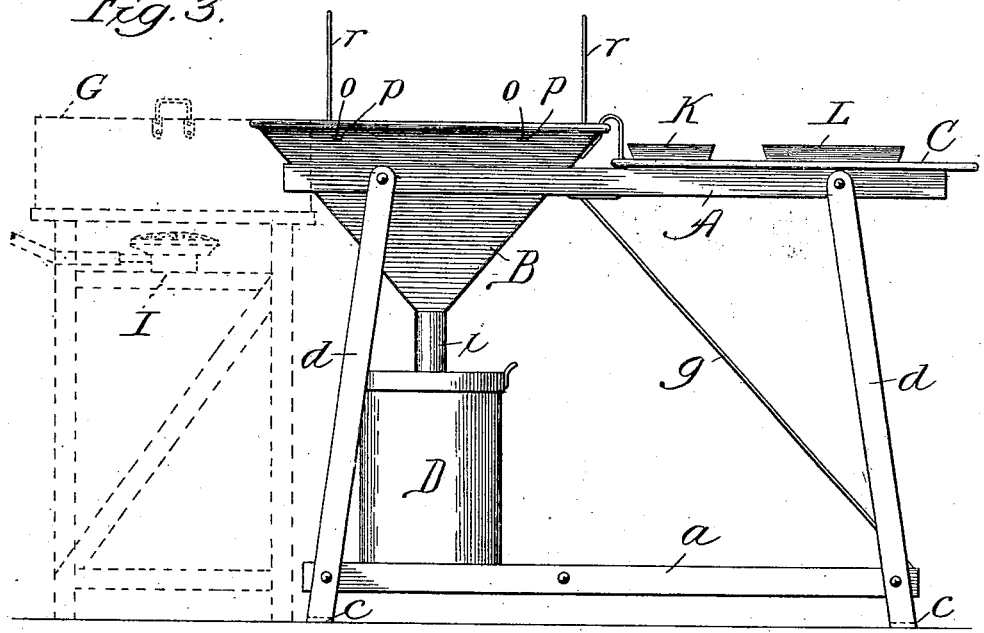
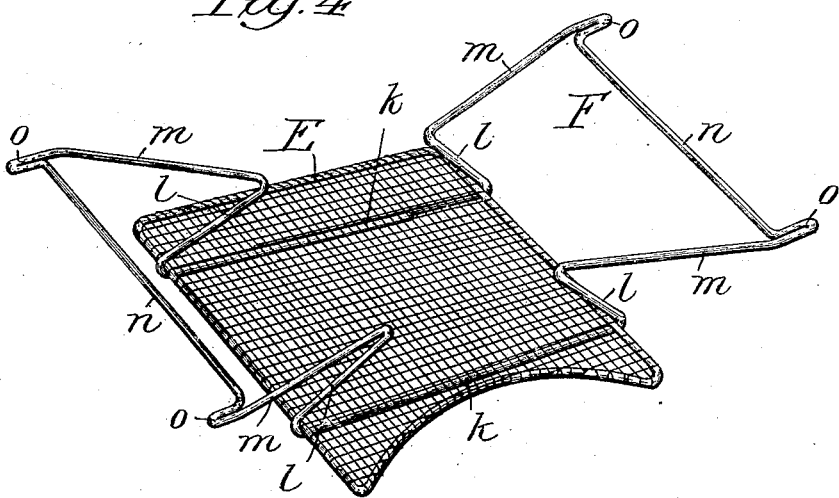
Witnesses:
John Enders
Clyde Palmer
Inventor:
George H. Trepanier,
By Dyrenforth, Lee, Chritton & Wiles
Attys.

UNITED STATES PATENT OFFICE.

GEORGE H. TREPANIER, OF IRON MOUNTAIN, MICHIGAN.

DOUGHNUT-DRAINER.

No. 923,465.  Specification of Letters Patent.  Patented June 1, 1909.

Application filed August 15, 1908. Serial No. 448,686.

*To all whom it may concern:*

Be it known that I, GEORGE H. TREPANIER, a citizen of the United States, residing at Iron Mountain, in the county of Dickinson and State of Michigan, have invented a new and useful Improvement in Doughnut-Drainers, of which the following is a specification.

The object of my invention is to provide an apparatus for use more particularly by bakers in making doughnuts and analogous articles which are cooked in lard, for draining off the lard from the newly cooked articles preparatory to coating them, as with sugar.

It is a usual practice in making doughnuts to empty them, when newly cooked, from the grate on which they are supported while cooking in the lard-pan, into a receiving-pan, whence they are picked out to be coated, and in that case the lard drains from them into the bottom of the receiving-pan and thus the doughnuts become unduly greasy on their under sides; and it is also a usual practice to empty the newly cooked doughnuts from the lard-pan grate upon a receiving-grate formed of wood or flat wire, permitting the lard to drain upon the floor before the doughnuts are picked off to be coated, thereby not only soiling the floor but causing loss of a considerable quantity of lard.

My improvement not only effects thorough draining of the doughnuts, thus rendering them less greasy, but all the lard that is drained off may be saved for repeated use, thereby avoiding waste.

In the accompanying drawings, Figure 1 is a plan view of my apparatus but omitting a removable-grate feature; Fig. 2 is a section on line 2, Fig. 1, showing the removable-grate feature in place; Fig. 3 shows the apparatus by a view in side elevation with a doughnut-cooking pan and gas-stove for heating it represented by dotted lines in coöperative relation to the apparatus, and Fig. 4 is a perspective view of a bracket-detail supporting the perforate bottom of the draining hopper and forming a grate-seat.

The frame of the apparatus is shown in its preferred form of a light structure comprising a rectangular base-member $a$ containing a pan $b$ in one end and supported in slightly elevated position upon feet $c$ on the lower ends of legs $d$ secured to it near its corners and carrying at their upper ends the top-member A of the same general shape as the base-member but somewhat larger and bowed inwardly at one end, as shown at $e$ (Fig. 2), for the purpose hereinafter explained. Between its ends the top-member is provided with a cross-bar $f$ and a brace-bar $g$ extends from the cross-bar to an end of the base-member $a$. A hopper B having a concave side $h$, seats in the top frame-member with that side against and conforming to the concave end $e$ which, with the adjacent portions of the sides of the top frame-member and the cross-bar support the hopper stably, leaving the remainder, or about one-half the length of the top-member, as a support for a top C, which is loosely connected hingedly with the inner edge of the hopper to adapt it to be swung over the latter and form a cover for it, the free outer edge of the cover conforming to the upper edge of the concave hopper-side $h$. A spout $i$ depends from the hopper to extend into a tank D, through its top, the tank being removably supported on the pan $b$ and affording a receptacle for the lard drained into the hopper as hereinafter described. A perforated bottom E, preferably of woven wire, and conforming to the cross-sectional shape of the interior of the hopper, is supported in the latter on a removable bracket F, that shown being composed, to render it a skeleton-bracket, of a continuous length of springy wire bent to form a support $k$ for the bottom E, with arms $l$ extending from its opposite ends and inclining upwardly over the perforated bottom to confine it against being raised out of place; the arms $l$ having backward extensions $m$ formed by bending the wire, and the members of each pair of the arms being connected by a cross-piece $n$, formed in the same way, with projections $o$ at the junctions of the sections $m$ and $n$ to pass through openings $p$ in proper position in opposite walls of the hopper for confining the bracket in place. To remove the bracket and with it the bottom E for cleaning it, a cross-piece $n$ is sprung to withdraw the respective projections $o$ out of the openings $p$ confining them, thereby releasing the bracket and permitting it to be taken out of the hopper, into which it may be readily replaced by springing it back into position.

The concave end of the frame adapts it to conform to the pan G commonly used for holding the lard in which the doughnut forms are introduced for cooking them, upon a grate H removably fitting in the pan and provided with handles $r$ by which to manipulate it, the pan being supported on a suitable heater I or stove.

To use my apparatus, the hopper-cover C is turned to its table-top position wherein it affords a convenient support for a sugar-pan K and a pan L for holding or storing the coated doughnuts. When a grate filled with cooked doughnuts is removed from the pan G, they are emptied into the hopper to drain from them the lard through the bottom E into the tank D, and while they are thus draining the emptied grate H is placed on the bracket-arm extensions $m$, which form an open seat therefor in convenient position for it to be loaded with a fresh supply of doughnut forms to be cooked; and the loaded grate is introduced into the pan G to permit the cooking to proceed while the previously cooked batch is being drained and coated. After draining the lard from a batch of the doughnuts, they are picked out of the hopper and introduced into the pan K for coating in a usual manner, and the coated doughnuts are stored in the pan L.

When the apparatus is out of use the top C it turned to its hopper-covering position to shield the hopper against the ingress of foreign matter; and as the tank D becomes filled, it is removed and emptied of the lard drained into it to permit repeated use thereof, and the tank is returned to place.

What I claim as new, and desire to secure by Letters Patent, is—

1. In a doughnut-drainer, the combination of a frame, a lard-draining hopper supported on the frame and provided with a concave outer side, a bracket removably supported in the hopper, and a perforate bottom for the hopper supported on said bracket within the hopper and conforming to the cross-sectional shape thereof, for the purpose set forth.

2. In a doughnut-drainer, the combination of a frame, a tank removably supported on the frame, a lard-draining hopper supported on said frame and terminating at its lower end in a spout to discharge into said tank, a perforate bottom supported in the hopper between its ends, and an open grate-seat removably fastened in the hopper to extend within the same above said bottom, for the purpose set forth.

3. In a doughnut-drainer, the combination of a frame provided with a top-member, a lard-draining hopper supported in said member and containing a perforate bottom, an open grate-seat in the hopper above said bottom, and a convertible hopper-cover and table-top hingedly connected with the hopper, for the purpose set forth.

4. In a doughnut-drainer, the combination of a frame, a lard-draining hopper supported on the frame, a skeleton spring bracket removably secured in said hopper and forming therein a hopper-bottom confining support and a grate-seat extending over said support, and a perforate bottom confined in the hopper on said bracket-support, for the purpose set forth.

5. A doughnut-drainer comprising, in combination, a frame provided with a top-member having a concave end, a lard-draining hopper supported in said member and fitting against said ends, provided with a discharge-spout, a pan on the frame-base, a tank on said pan into which said spout discharges, a bracket in the hopper forming an open grate-seat, a perforate hopper bottom supported on the bracket below said seat, and a convertible hopper-cover and table-top hingedly connected with the hopper, for the purpose set forth.

GEORGE H. TREPANIER.

In presence of—
H. M. PELHAM,
OLIVER EVANS.